United States Patent
Jaldén et al.

(10) Patent No.: US 11,647,497 B2
(45) Date of Patent: May 9, 2023

(54) UPLINK SCHEDULING BASED ON UPPER AND LOWER SNR TARGETS

(71) Applicant: Telefonaktiebolaget LM Ericsson (publ), Stockholm (SE)

(72) Inventors: Niklas Jaldén, Enköping (SE); Svante Bergman, Hägersten (SE); Fredrik Nordström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 92 days.

(21) Appl. No.: 16/971,088

(22) PCT Filed: Mar. 28, 2018

(86) PCT No.: PCT/EP2018/057960
§ 371 (c)(1),
(2) Date: Aug. 19, 2020

(87) PCT Pub. No.: WO2019/185142
PCT Pub. Date: Oct. 3, 2019

(65) Prior Publication Data
US 2020/0396753 A1    Dec. 17, 2020

(51) Int. Cl.
*H04W 72/12*    (2009.01)
*H04W 52/14*    (2009.01)
(Continued)

(52) U.S. Cl.
CPC ..... *H04W 72/1268* (2013.01); *H04W 52/146* (2013.01); *H04W 52/241* (2013.01);
(Continued)

(58) Field of Classification Search
None
See application file for complete search history.

(56) References Cited

U.S. PATENT DOCUMENTS

| | | | |
|---|---|---|---|
| 6,195,480 B1* | 2/2001 | Kosaka | H04B 10/2935 359/337.12 |
| 7,477,904 B2* | 1/2009 | Evans | H04W 64/00 455/456.1 |

(Continued)

FOREIGN PATENT DOCUMENTS

CN        102573028 A       7/2012

OTHER PUBLICATIONS

"3GPP TS 36.213 V15.0.0", 3rd Generation Partnership Project; Technical Specification Group Radio Access Network; Evolved Universal Terrestrial Radio Access (E-UTRA); Physical layer procedures (Release 15), Dec. 2017, pp. 1-493.

*Primary Examiner* — Gregory B Sefcheck
(74) *Attorney, Agent, or Firm* — Murphy, Bilak & Homiller, PLLC

(57) ABSTRACT

Uplink radio transmissions (22) from a radio device (10) are scheduled by allocating radio resources for the uplink radio transmissions (22) and controlling a transmit power of the uplink radio transmissions (22). Depending on a bandwidth of radio resources to be allocated for an uplink radio transmission (22) and a current value of the transmit power, an estimate of the signal-to-noise ratio of the uplink radio transmission (22) is determined. The estimate of the signal-to-noise ratio is compared to at least one of the lower target and the upper target. Depending on a result of the comparison, the bandwidth is adapted, and radio resources for the uplink radio transmission (22) are allocated in accordance with the adapted bandwidth.

18 Claims, 7 Drawing Sheets

(51) Int. Cl.
*H04W 52/24* (2009.01)
*H04W 52/36* (2009.01)
*H04W 72/1268* (2023.01)

(52) U.S. Cl.
CPC ..... *H04W 52/365* (2013.01); *H04W 72/1236* (2013.01); *H04W 72/1289* (2013.01)

(56) References Cited

U.S. PATENT DOCUMENTS

| | | | | |
|---|---|---|---|---|
| 8,116,697 | B2 * | 2/2012 | Gates | H04B 1/406 |
| | | | | 455/102 |
| 8,145,251 | B2 * | 3/2012 | Love | H04W 52/367 |
| | | | | 455/522 |
| 8,483,737 | B2 | 7/2013 | Englund et al. | |
| 8,570,957 | B2 * | 10/2013 | Ball | H04W 52/367 |
| | | | | 370/329 |
| 8,644,875 | B2 * | 2/2014 | Kiukkonen | H04W 52/36 |
| | | | | 455/522 |
| 8,825,100 | B2 * | 9/2014 | Chang | H04W 52/346 |
| | | | | 455/522 |
| 8,929,227 | B2 * | 1/2015 | Lee | H04W 52/241 |
| | | | | 370/248 |
| 9,813,996 | B2 * | 11/2017 | Kishiyama | H04W 16/18 |
| 9,820,296 | B2 * | 11/2017 | Madan | H04L 5/0073 |
| 9,929,852 | B2 * | 3/2018 | Liu | H04L 1/0009 |
| 10,334,534 | B2 * | 6/2019 | Alpert | H04W 52/24 |
| 10,420,034 | B1 * | 9/2019 | Zheng | H04W 52/267 |
| 10,462,674 | B2 * | 10/2019 | Freda | H04L 5/0073 |
| 10,462,755 | B2 * | 10/2019 | Akkarakaran | H04W 52/325 |
| 11,032,780 | B2 * | 6/2021 | Bharadwaj | H04L 1/0009 |
| 2014/0153500 | A1 * | 6/2014 | Duan | H04W 52/367 |
| | | | | 370/329 |
| 2014/0274196 | A1 * | 9/2014 | Dai | H04W 52/242 |
| | | | | 455/522 |
| 2021/0099962 | A1 * | 4/2021 | Bharadwaj | H04W 52/143 |
| 2021/0243411 | A1 * | 8/2021 | Zalevsky | G01H 9/00 |
| 2021/0297199 | A1 * | 9/2021 | Miao | H04B 7/063 |

\* cited by examiner

UPLINK SCHEDULING BASED ON UPPER AND LOWER SNR TARGETS

TECHNICAL FIELD

The present invention relates to methods for controlling radio transmissions in a wireless communication network and to corresponding nodes, systems, and computer programs.

BACKGROUND

In wireless communication networks, a UE (user equipment) may receive DL (downlink) radio transmissions from the wireless communication network and send UL (uplink) radio transmissions to the wireless communication network. Both the DL radio transmissions and the UL radio transmissions may be subject to scheduling by a node of the wireless communication network. For example, in the LTE (Long Term Evolution) radio technology as specified by 3GPP ($3^{rd}$ Generation Partnership Project) an access node referred to as eNB (evolved Node B) is responsible for scheduling of the DL and UL radio transmissions. Typically, the scheduling involves allocation of radio resources, power control, and link adaptation by adaptation of an MCS (modulation and coding scheme) used for the radio transmissions.

Details of power control in the LTE radio technology are for example defined in 3GPP TS 36.213 V15.0 (2017-12). In the case of the UL radio transmissions, the power control may involve open loop power control and closed loop power control. Open loop control of the transmit power of the UL radio transmissions is performed within the UE, based on parameters indicated by higher layer signaling to the UE. Closed loop control is accomplished on a shorter time scale than open loop control and involves sending transmit power control (TPC) commands from the eNB to the UE, using DCI (Downlink Control Information) transmitted on a PDCCH (Physical Downlink Control Channel).

Within the UE, open loop control may be accomplished on the basis of parameters referred to as $P_O$, $\alpha$, and $\Delta_{TF}$. These parameters may be tuned to compensate effects of long term changes of pathloss or scheduled changes of MCS. The parameter $P_O$ is a static power level and may for example represent a nominal power level of the UL radio transmissions. The parameter $\alpha$ may be tuned to compensate long-term variations of path-loss of the radio channel from the UE to the wireless communication network. The parameter $\Delta_{TF}$ may be tuned to control increase the transmit power as a function of the scheduled MCS.

The parameter $\alpha$ is used both is a common parameter for the open loop control and the closed loop control. According to 3GPP TS 36.213 V15.0.0, section 5.1.1.1, UL power control may be accomplished according to:

$$P_{TX}=\min[P_{CMAX},\log(M)+P_O+\alpha*PL+\Delta_{TF}+f] \qquad (1)$$

where $P_{CMAX}$ is a maximum transmit power of the UE, M is a number of RBs (resource blocks) allocated for the UL radio transmission, PL is the pathloss of the UL radio channel as estimated by the UE, and f represents an adjustment according to the TPC commands received from the eNB.

The parameter $P_O$ is indicated by higher layer signaling to the UE. The parameter $P_O$ is typically determined with the aim of achieving a certain target value of an SNR (signal-to-noise ratio) of the UL radio transmissions, in the following also referred to as $SNR_{target}$. The value of the $SNR_{target}$ may for example correspond to the signal power level over the noise floor at each antenna element used for receiving the UL radio transmission. For example, the parameter $P_O$ may be determined according to $$P_O=\alpha*(SNR_{target}+P_n)+(1-\alpha)*(P_{CMAX}-\log(M_0)), \qquad (2)$$

where $M_0$ denotes a maximum number of RBs which can be allocated to an UL radio transmission, $P_n$ denotes the noise level per receiving antenna element and RB, and $SNR_{target}$ denotes the desired SNR per receiving antenna element and RB.

At the eNB a scheduling algorithm decides for each subframe which UEs served by the eNB are scheduled for an UL radio transmission and on which RBs these UEs shall send the UL radio transmission. In view of efficient utilization of radio resources, the scheduling algorithm may decide to allocate more RBs to UEs experiencing good UL radio channel conditions than to UEs with less favorable UL radio channel conditions. At the same time, the scheduling algorithm may perform prioritization among the different UEs. A corresponding scheduling algorithm is for example described in U.S. Pat. No. 8,483,737 B2.

Like for example described in U.S. Pat. No. 8,483,737 B2, the scheduling algorithm may also be responsible for controlling the transmit power of the UL radio transmissions. The transmit power may be adjusted so that on the one hand the SNR meets a desired target value, and on the other hand excessive interference by the UL radio transmissions is avoided. This may for example involve reducing the transmit power for UEs with good UL radio channel conditions. Further, this may involve reducing the number of allocated RBs for UEs with poor UL radio channel conditions, thereby reducing the bandwidth used for the UL radio transmission and increasing the available signal power per RB, in order to meet the target value of the SNR. In U.S. Pat. No. 8,483,737 B2 an SINR (signal-to-interference-and-noise ratio) target may be selected from candidate values covering a range between a minimum SINR target value and a maximum SINR target value. The allocation of RBs is then accomplished on the basis of the selected SINR target.

However, the above-mentioned way of performing scheduling with the aim of meeting a specific SNR target value may result in utilizing the available radio resources in a manner which is unsatisfactory from the perspective of overall system performance. For example, if a certain UE is below the selected SNR target, the number of RBs allocated to the might be reduced, resulting in inefficient utilization of the available RBs.

Accordingly, there is a need for techniques which allow for efficiently controlling bandwidth and transmission power when scheduling UL radio transmissions.

SUMMARY

According to an embodiment, a method of controlling radio transmissions in a wireless communication network is provided. The method comprises determining a lower target and an upper target for a signal to noise ratio of UL radio transmissions from a radio device to the wireless communication network. Further, the method comprises scheduling the UL radio transmissions by allocating radio resources for the UL radio transmissions and controlling a transmit power of the UL radio transmissions. The scheduling comprises, depending on a bandwidth of radio resources to be allocated for an UL radio transmission and a current value of the transmit power, determining an estimate of the SNR of the UL radio transmission. Further, the scheduling comprises comparing the estimate of the SNR to at least one of the lower target and the upper target and, depending on a result of the comparison, adapting the bandwidth and allocating radio resources for the UL radio transmission in accordance with the adapted bandwidth.

According to a further embodiment, a node for a wireless communication network is provided. The access node is configured to determine a lower target and an upper target for a signal to noise ratio of UL radio transmissions from a radio device to the wireless communication network. Further, the node is configured to perform scheduling of the UL radio transmissions by allocating radio resources for the UL radio transmissions and controlling a transmit power of the UL radio transmissions. The scheduling comprises, depending on a bandwidth of radio resources to be allocated for an UL radio transmission and a current value of the transmit power, determining an estimate of the SNR of the UL radio transmission. Further, the scheduling comprises comparing the estimate of the SNR to at least one of the lower target and the upper target and, depending on a result of the comparison, adapting the bandwidth and allocating radio resources for the UL radio transmission in accordance with the adapted bandwidth.

According to a further embodiment, a system is provided. The system comprises a radio device and a node for a wireless communication network. The node is configured to determine a lower target and an upper target for a signal to noise ratio of UL radio transmissions from a radio device to the wireless communication network. Further, the node is configured to perform scheduling of the UL radio transmissions by allocating radio resources for the UL radio transmissions. The scheduling comprises, depending on a bandwidth of radio resources to be allocated for an UL radio transmission and a current value of the transmit power, determining an estimate of the SNR of the UL radio transmission. Further, the scheduling comprises comparing the estimate of the SNR to at least one of the lower target and the upper target and, depending on a result of the comparison, adapting the bandwidth and allocating radio resources for the UL radio transmission in accordance with the adapted bandwidth.

According to a further embodiment of the invention, a computer program or computer program product is provided, e.g., in the form of a non-transitory storage medium, which comprises program code to be executed by at least one processor of a node for a wireless communication network. Execution of the program code causes the node to determine a lower target and an upper target for a signal to noise ratio of UL radio transmissions from a radio device to the wireless communication network. Further, the node is configured to perform scheduling of the UL radio transmissions by allocating radio resources for the UL radio transmissions. The scheduling comprises, depending on a bandwidth of radio resources to be allocated for an UL radio transmission and a current value of the transmit power, determining an estimate of the SNR of the UL radio transmission. Further, the scheduling comprises comparing the estimate of the SNR to at least one of the lower target and the upper target and, depending on a result of the comparison, adapting the bandwidth and allocating radio resources for the UL radio transmission in accordance with the adapted bandwidth.

Details of such embodiments and further embodiments will be apparent from the following detailed description of embodiments.

DETAILED DESCRIPTION OF EMBODIMENTS

Figure 1:
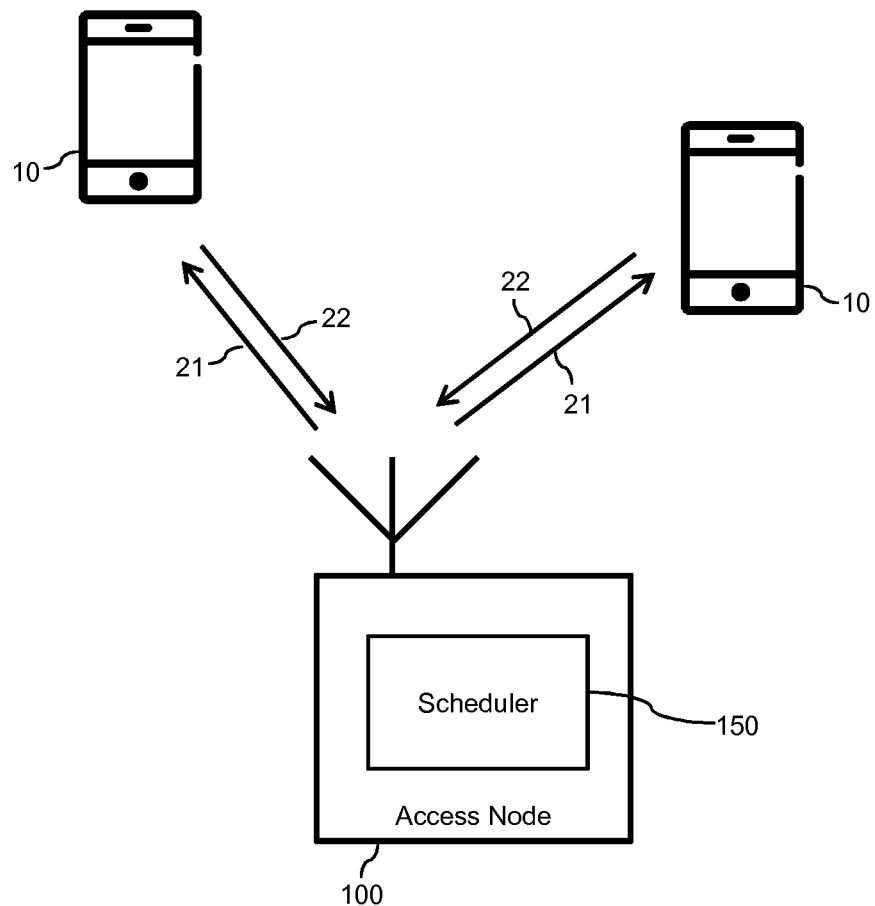
FIG. 1 illustrates an example of processes in a wireless communication system according to an embodiment of the invention.

In the following, concepts in accordance with exemplary embodiments of the invention will be explained in more detail and with reference to the accompanying drawings. The illustrated embodiments relate to controlling radio transmissions in a wireless communication network, in particular to scheduling of UL radio transmissions from one or more radio devices. The wireless communication network may for example be based on the LTE radio technology as specified by 3GPP or a 5G ($5^{th}$ generation) radio technology as currently developed by 3GPP. However, it is to be understood that other radio technologies using scheduling of UL radio transmissions could be used as well. The radio devices may correspond to various types of UE, such as mobile phones, portable or stationary computers, MTC (machine type communication) devices like autonomous sensors or actors, or the like. However, it is noted that the illustrated concepts could also be applied with respect to various other types of devices, such as relay stations, routers, In the illustrated examples, UL radio transmissions are scheduled on the basis of a scheduling algorithm which is based on a lower target and an upper target for the SNR and a lower target for the SNR of an UL radio transmission from a radio device to the wireless communication network. When scheduling the UL radio transmission, the SNR which can be expected for the UL radio transmission is estimated on the basis of a bandwidth of radio resources to be allocated for the UL radio transmission and on the basis of a current value of the transmit power of the radio device, in the following also referred to as allocation bandwidth. The estimated SNR is compared to the lower target and to the upper target. On the basis of the comparison, the bandwidth of the allocated resources is adapted, and allocation of radio resources for the UL radio transmission is accomplished in accordance with the adapted bandwidth. This may involve reducing the bandwidth, increasing the bandwidth, or maintaining the bandwidth. When allocating the radio resources, the bandwidth may define an upper limit for the amount of allocated radio resources. Accordingly, if sufficient radio resources are available, the scheduling algorithm may allocate radio resources corresponding to the adapted bandwidth to the radio device. However, the scheduling algorithm may also allocate less radio resources than defined by the adapted bandwidth to the radio device, e.g., because the available amount of radio resources needs to be fairly allocated among multiple radio devices. Further, the transmit power may be adapted depending on the comparison.

By using the upper and the lower target as a basis whether to adapt the bandwidth, usage of the available radio resources may be controlled in a refined manner. For example, a reduction of the bandwidth may be initiated in response to the estimated SNR being below the lower target, but not if the estimated SNR is between the upper target and the lower target, i.e., only below the upper target. Accordingly, while the estimated SNR is between the upper target and the lower target, a higher bandwidth can be used for the UL radio transmission, thereby achieving a more efficient usage of the available radio resources.

FIG. 1 schematically illustrates a wireless communication system which may be used to implement the concepts as outlined above. As illustrated, the wireless communication system includes radio devices 10, in the following also referred to as UEs, and an access node 100. In accordance with assumed utilization of the LTE radio technology, the access node 100 may also be referred to as eNB. The access node 100 is responsible for sending DL radio transmissions 21 to the UEs 10 and for receiving UL radio transmissions 22 from the UEs 10. Further, the access node 100 is also responsible for controlling the DL radio transmissions 21 and the UL radio transmissions 22. In particular, the access node 100 is provided with a scheduler 150 which implements functionalities of the scheduling algorithm as outlined above.

Accordingly, the scheduler may allocate radio resources for the UL radio transmissions 22 and control the transmit power used by the UEs 10 when sending the UL radio transmissions 22. The scheduler 150 may also control link adaptation for the UL radio transmissions 22, by selecting an MCS used by the UEs 10 when sending the UL radio transmissions 22. In a similar manner, the scheduler 150 may also perform scheduling of the DL radio transmissions 21, control the transmit power of the DL radio transmissions, and control link adaptation of the DL radio transmissions 21.

Figure 2:
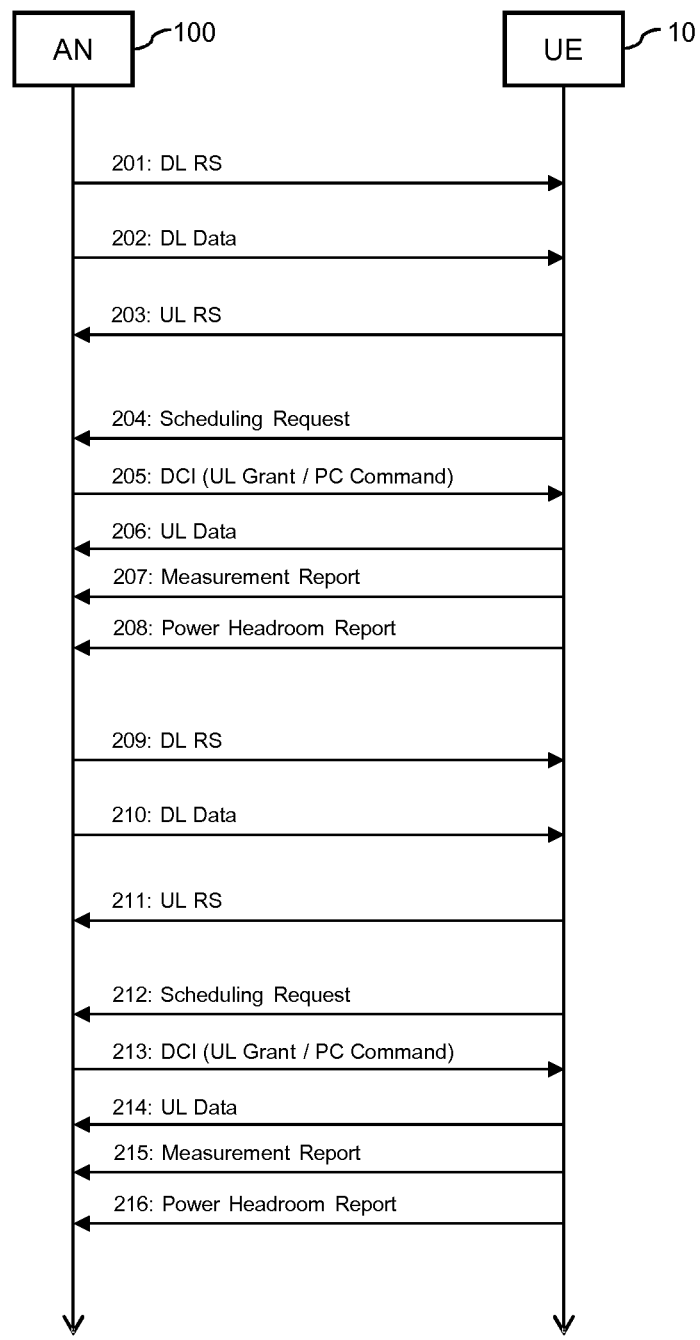
FIG. 2 illustrates examples of radio transmissions between a radio device and an access node of the wireless communication network.

FIG. 2 illustrates examples of radio transmissions which may be performed between the UEs 10 and the access node (AN) 100. Here, it is noted that the radio transmissions shown in FIG. 2 do not need to be transmitted in the illustrated order. Further, not all of the illustrated radio transmissions need to be transmitted.

As illustrated in FIG. 2, the access node 100 may send a DL reference signal 201, which is received by the UE 10. The UE 10 may use the DL reference signal 201 for performing measurements to assess the radio channel between the UE 10 and the access node 100. For example, the UE 10 may measure a quality of the radio channel in terms of a RSRP (Reference Signal Received Power) or a CQI (Channel Quality Indicator).

As further illustrated, the access node 100 may send a DL data transmission 202 to the UE 10. The DL data transmission 202 may include control information and/or user plane data. The UE 10 may also use the DL data transmission 202 for performing measurements to assess the radio channel between the UE 10 and the access node 100. For example, the UE 10 may use the DL data transmission to assess the quality of the radio channel in terms of bit error rate or block error rate.

As further illustrated, the UE 10 may send a UL reference signal 203, which is received by the access node 100. The access node 100 may use the UL reference signal 203 for performing measurements to assess the radio channel between the UE 10 and the access node 100. For example, the access node 100 may measure a quality of the radio channel in terms of a RSRP or a CQI.

As further illustrated, the UE 10 may send a scheduling request 204 to the access node 100. The scheduling request 204 may be used within a dynamic scheduling process to indicate to the access node 100 that the UE 10 needs to transmit data. In response to receiving the scheduling request 204, the access node schedules one or more UL radio transmissions by allocating radio resources for the UL radio transmission(s) to the UE 10, and sends DCI 205 including an UL grant to the UE 10. The UL grant indicates the allocated radio resources, e.g., in terms of one or more RBs. The scheduling of the UL radio transmission(s) may be based on the above-mentioned measurements performed by the access node 100 on the UL reference signal 203, in particular on the measured quality of the radio channel.

As further illustrated, the DCI 205 may also include a TPC command for adapting the transmit power of the scheduled UL radio transmission(s). The TPC command may be a positive TPC command instructing the UE 10 to increase its transmit power or a negative TPC command instructing the UE 10 to reduce its transmit power. The TPC command may also indicate a step size of adjusting the transmit power, e.g., by −1 dB, +1 dB, or +3 dB. Moreover, the DCI 205 may also indicate an MCS to be used for the UL radio transmission(s).

As further illustrated, the UE 10 then proceeds by performing the scheduled UL radio transmission(s). In the illustrated example, the UE 10 uses the UL radio transmission(s) to send UL data 206, a measurement report 207, and a power headroom report 208. Here, it is noted that the UL data 206, a measurement report 207, and a power headroom report 208 could be included in the same UL radio transmission or in two or more separate UL radio transmissions. The measurement report 207 may for example indicate the quality of the radio signal as measured by the UE 10 on the basis of the DL reference signal 201 and/or on the basis of the DL data transmission 202. The power headroom report 208 indicates the difference between the UE's 10 maximum transmit power and the current transmit power, i.e., the transmit power used for the latest UL radio transmission. It is noted that not all of this information needs to be present in the UL radio transmission(s). For example, the UE 10 could send an UL radio transmission including only the measurement report 207 and/or the power headroom report 208, but not the UL data 206. Further, the UE 10 could also send an UL radio transmission which includes the ULE data 206, but not the measurement report 207 and the power headroom report 208. As further detailed below, the access node may use information gathered from the measurement report 207 and/or from the power headroom report 208 in the process of scheduling further UL radio transmissions.

In the example of FIG. 2, the access node 100 may send a further DL reference signal 209, which is received by the UE 10. The UE 10 may use the further DL reference signal 209 for performing further measurements to assess the radio channel between the UE 10 and the access node 100, e.g., in terms of a RSRP or a CQI. Further, the access node 100 may send a further DL data transmission 210 to the UE 10, which may include control information and/or user plane data, and may be used by the UE 10 for performing further measurements to assess the radio channel between the UE 10 and the access node 100, in terms of bit error rate or block error rate. Further, the UE 10 may send a further UL reference signal 211, which is received by the access node 100. The access node 100 may use the further UL reference signal 211 for performing further measurements to assess the radio channel between the UE 10 and the access node 100, e.g., in terms of a RSRP or a CQI.

In the example of FIG. 2, the UE 10 then sends a further scheduling request 212 to the access node 100. In response to receiving the scheduling request 212, the access node 100 schedules one or more further UL radio transmissions by allocating radio resources for the UL radio transmission(s) to the UE 10, and sends DCI 213 including an UL grant to the UE 10. The UL grant indicates the allocated radio resources, e.g., in terms of one or more RBs. The scheduling of the further UL radio transmission(s) may be based on the above-mentioned measurements performed by the access node 100 on the UL reference signal 203, on the UL reference signal 211, on the measurement report 207, and/or on the power headroom report 208. As further illustrated, the DCI 213 may also include a TPC command for adapting the transmit power of the scheduled UL radio transmission(s). As mentioned above, the TPC command may be a positive TPC command or a negative TPC command and may also indicate a step size of adjusting the transmit power. Moreover, the DCI 213 may also indicate an MCS to be used for the further UL radio transmission(s).

In the example of FIG. 2 it was assumed that the UL radio transmissions are scheduled in a dynamic manner, in response to scheduling requests 204, 212 from the UE 10. However, it is to be understood that the scheduling of the UL radio transmissions could also be initiated without requiring an explicit scheduling request from the UE 10, e.g., in response to a BSR (buffer status report) or on the basis of a semi-persistent scheduling mechanism.

Figure 3:
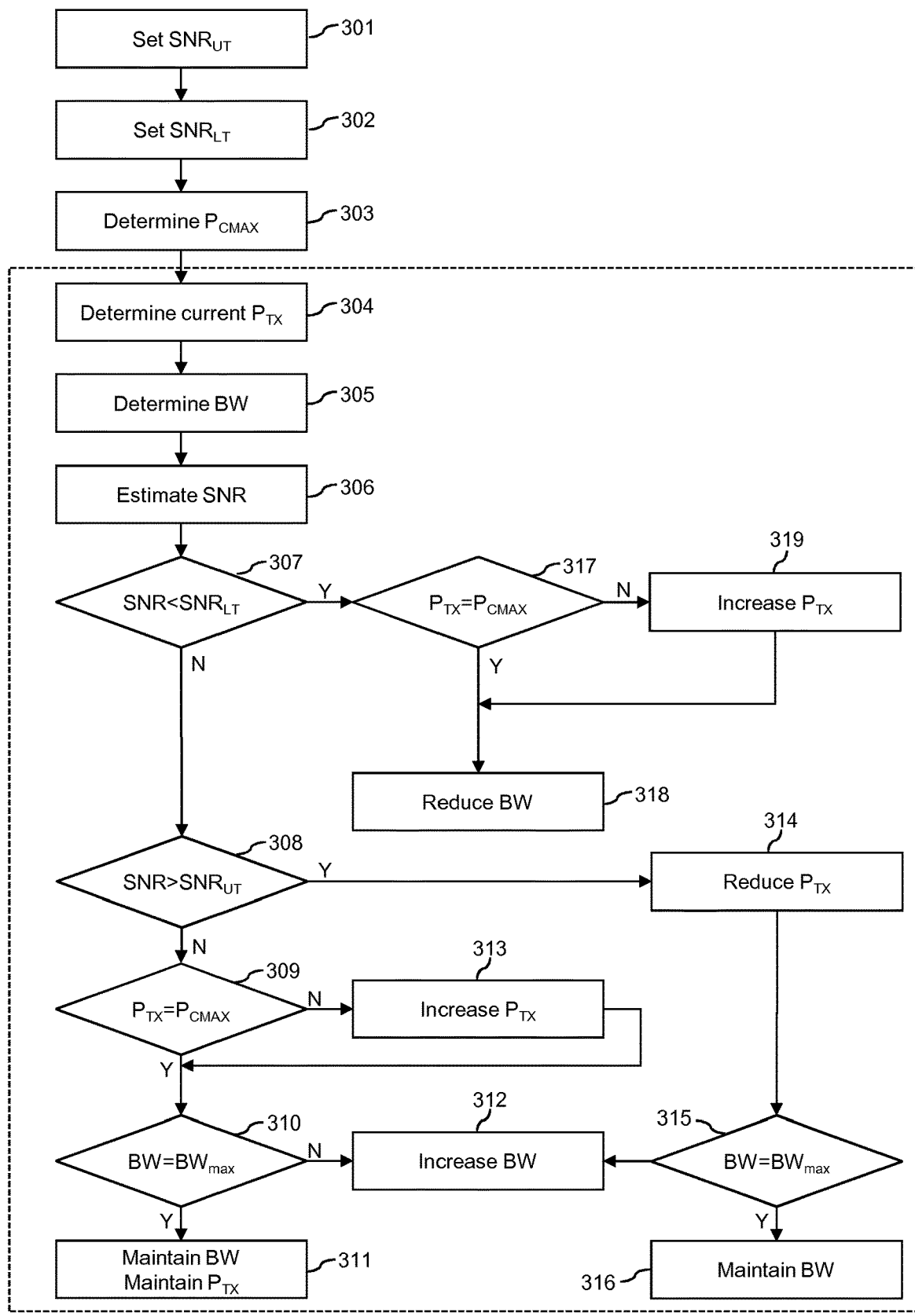
FIG. 3 shows a flowchart for illustrating scheduling processes according to an embodiment of the invention.

FIG. 3 shows a flowchart for further illustrating the scheduling of the UL radio transmissions 22 by the scheduler 150 of the access node 100.

At block 301, the scheduler 150 sets the upper target of the SNR, denoted by $SNR_{UT}$. The scheduler 150 may set the upper target $SNR_{UT}$ depending on information configured in the scheduler 150, e.g., in terms of a lookup table. The value of the upper target $SNR_{UT}$ may for example correspond to the desired signal power level over the noise floor at each antenna element used for receiving the UL radio transmission. Accordingly, the upper target $SNR_{UT}$ may be set depending on the number of antenna elements of the access node 100, receiver characteristics of the access node 100, and depending on expected radio conditions. The expected radio conditions may for example depend on deployment characteristics, like inter-site distance (ISD), i.e., the spacing of the access node 100 from neighboring access nodes, carrier frequencies used for the UL radio transmissions, size of a cell served by the access node 100, maximum number of UEs 10 in the cell served by the access node 100, or the like. For example, a large ISD may result in less interference from neighboring cells and thus lower required signal power level over the noise floor.

At block 302, the scheduler 150 sets the lower target of the SNR, denoted by $SNR_{LT}$. Similar to the upper target $SNR_{UT}$, the scheduler 150 may set the lower target $SNR_{LT}$ depending on information configured in the scheduler 150, e.g., in terms of a lookup table. The scheduler 150 may also set the lower target $SNR_{LT}$ depending relative to the upper target $SNR_{UT}$, e.g., at a certain distance from the upper target $SNR_{UT}$. For example, the lower target $SNR_{UT}$ could be set at least 5 dB lower than the upper target $SNR_{UT}$. Similar to the upper target $SNR_{UT}$, the lower target $SNR_{LT}$ may be set depending on the number of antenna elements of the access node 100, receiver characteristics of the access node 100, and depending on expected radio conditions. The expected radio conditions may for example depend on deployment characteristics, like ISD, i.e., the spacing of the access node 100 from neighboring access nodes, carrier frequencies used for the UL radio transmissions, size of a cell served by the access node 100, maximum number of UEs 10 in the cell served by the access node 100, or the like. Further, the distance of the lower target $SNR_{LT}$ and the upper target $SNR_{UT}$ may depend on a minimum step size of controlling the transmit power UL radio transmissions 22. For example, when assuming a typical minimum step size of 0.5 dB or 0.6 dB, the lower target $SNR_{LT}$ may be set with a distance of at least 5 dB to 6 dB below the upper target $SNR_{UT}$. This distance is about one order of magnitude larger than the minimum step size and was found to harmonize well with the power control operations. As a general rule, setting the lower target $SNR_{LT}$ as low as possible is desirable from the perspective of maximizing the bandwidth allocation of the UE 10. However, at some point meeting the lower target $SNR_{LT}$ with the maximum supported bandwidth may no longer be possible because the UE 10 already operates with maximum transmit power and the most robust MCS. Accordingly, it is desirable to set the lower target as low as possible, without going beyond the point where meeting the lower target $SNR_{LT}$ with the maximum supported bandwidth is no longer possible.

At block 303, the scheduler 150 may determine a maximum transmit power of the UE 10, denoted by $PC_{MAX}$. The maximum transmit power $PC_{MAX}$ may depend on the type of the UE 10. A typical value of the maximum transmit power $P_{CMAX}$ is 23 dBm.

The processes of blocks 301, 302, 303, may be regarded as preparatory steps. The setting of the upper target $SNR_{UT}$ and of the lower target $SNR_{LT}$ may be accomplished when configuring the deployment of the wireless communication network with the access node 100, i.e., on a long term basis. The determination of the maximum transmit power may be accomplished individually for each UE 10, e.g., when the UE 10 connects to the access node 100.

At block 304, the scheduler 150 determines the current transmit power of the UE 10, denoted by $P_{TX}$. For determining the current transmit power, $P_{TX}$, the scheduler 150 may use the maximum transmit power $P_{CMAX}$ determined at block 303 and tracked TPC commands sent to the UE 10. In addition as an alternative, the scheduler 150 may use power headroom reports received from the UE, measurements on UL reference signals or other UL radio transmissions and/or measurements of radio channel quality reported by the UE 10 for estimating the current value of the transmit power $P_{TX}$, and/or measurements of radio channel quality reported by the UE 10.

At block 305, the scheduler 150 determines an initial allocation bandwidth BW for an UL radio transmission 22. The allocation bandwidth defines a maximum number of RBs that can be allocated to the UL radio transmission 22. The scheduler 150 may determine the allocation bandwidth BW on the basis of a bandwidth of RBs which were allocated for the last UL radio transmission 22 of the UE 10. In addition or as an alternative, the scheduler 150 may also estimate the allocation bandwidth BW from measurements on UL reference signals or other UL radio transmissions and/or measurements of radio channel quality reported by the UE 10.

At block 306, the scheduler 150 estimates the SNR which can be expected at the access node 100 when performing the scheduled UL radio transmission on the basis of the allocation bandwidth BW and the current transmit power. The SNR is estimated in a band with dependent manner. That is to say, it is taken into account that with increasing number of located RBs, the transmit power per RB decreases.

At block 307, the scheduler 150 compares the estimated SNR to the lower target $SNR_{LT}$. As illustrated, the scheduler 150 may check if the estimated SNR is lower than the lower target $SNR_{LT}$. If this is not the case, the scheduler 150 may proceed to block 308, as illustrated by branch "N".

At block 308, the scheduler 150 compares the estimated SNR to the upper target $SNR_{UT}$. As illustrated, the scheduler 150 may check if the estimated SNR is higher than the upper target $SNR_{UT}$. If this is not the case, the scheduler 150 may proceed to block 309, as illustrated by branch "N". In this case and the estimated SNR is in a range extending between the lower target $SNR_{LT}$ and the upper target $SNR_{UT}$.

At block 309, the scheduler 150 may check if the UE 10 operates at the maximum transmit power $P_{CMAX}$. For this purpose, the scheduler 150 may compare the current transmit power $P_{TX}$ to the maximum transmit power $P_{CMAX}$. If the UE 10 operates at the maximum transmit power $P_{CMAX}$, the scheduler 150 may proceed to block 310, as indicated by branch "Y".

At block 310, the scheduler 150 may check if the allocation bandwidth BW corresponds to a maximum allocation bandwidth $BW_{max}$, e.g., corresponding to the parameter $M_0$ in equation (2). If the allocation bandwidth BW corresponds to the maximum allocation bandwidth $BW_{max}$, the scheduler 150 may proceed to block 311 and maintain the present allocation bandwidth BW and also maintain the present transmit power $P_{TX}$. In some cases, the scheduler 150 may also select a more robust MCS to compensate possible effects of a lowered SNR when maintaining the present allocation bandwidth BW.

If the check of block 310 indicates that the UE 10 does not operate at the maximum transmit power $P_{CMAX}$, the scheduler 150 may proceed to block 312 and increase the allocation bandwidth BW, as indicated by branch "N". The increase of the allocation bandwidth may depend on a difference of the estimated SNR to the lower target $SNR_{LT}$. In particular, if the difference of the estimated SNR to the lower target $SNR_{LT}$ is high, a larger increase of the allocation bandwidth may be initiated than in the case of the difference of the estimated SNR to the lower target $SNR_{LT}$ being low. In this way, it can be avoided that the increase of the allocation BW results in an SNR below the lower target $SNR_{LT}$.

If the check of block 309 indicates that the UE 10 does not operate at the maximum transmit power $P_{CMAX}$, the scheduler 150 may proceed to block 313 and increase the transmit power $P_{TX}$, as indicated by branch "N". Increasing the transmit power $P_{TX}$ may involve triggering a positive TPC command to the UE 10, e.g., like described above for the DCI 205, 213. Having increased the transmit power $P_{TX}$, the scheduler 150 may continue with the above-described processes of block 310. By increasing the transmit power $P_{TX}$, the SNR may be improved towards the upper target $SNR_{UT}$, which makes the scheduled UL radio transmission 22 more robust and may also enable further increasing the bandwidth BW at block 310.

If the comparison of block 308 indicates that the estimated SNR is higher than the upper target $SNR_{UT}$, the scheduler 150 may proceed to block 314 and reduce the transmit power $P_{TX}$, as indicated by branch "Y". Reducing the transmit power $P_{TX}$ may involve triggering a negative TPC command to the UE 10, e.g., like described above for the DCI 205, 213. Having reduced the transmit power $P_{TX}$, the scheduler 150 may proceed to block 315.

At block 315, the scheduler 150 may check if the allocation bandwidth BW corresponds to the maximum allocation bandwidth $BW_{max}$. If the allocation bandwidth BW corresponds to the maximum allocation bandwidth $BW_{max}$, the scheduler 150 may proceed to block 316 and maintain the present allocation bandwidth BW, as indicated by branch "Y".

If the check of block 315 indicates that the UE 10 does not operate at the maximum transmit power $P_{CMAX}$, the scheduler 150 may proceed to block 312 and increase the allocation bandwidth BW, as indicated by branch "N". By reducing the transmit power $P_{TX}$, interference due to an excessively high transmit power may be avoided. At the same time, the SNR of the scheduled UL radio transmission 22 may be kept above the lower target $SNR_{LT}$. After reducing the transmit power at block 314, it may still be possible to further increase the bandwidth BW at block 312.

If the comparison of block 307 indicates that the estimated SNR is lower than the lower target $SNR_{LT}$, the scheduler 150 may proceed to block 317 and check if the UE 10 operates at the maximum transmit power $P_{CMAX}$. For this purpose, the scheduler 150 may compare the current transmit power $P_{TX}$ to the maximum transmit power $P_{CMAX}$. If the UE 10 operates at the maximum transmit power $P_{CMAX}$, the scheduler 150 may proceed to block 318 and reduce the allocation bandwidth BW, as indicated by branch "Y".

The reduction of the allocation bandwidth BW increases the transmit power per RB, i.e., results in an increased power spectral density of the UL radio transmission 22, thereby improving the SNR of the scheduled UL radio transmission 22 towards the lower target $SNR_{LT}$. The reduction of the allocation bandwidth may depend on a difference of the estimated SNR to the lower target $SNR_{LT}$. In particular, if the difference of the estimated SNR to the lower target $SNR_{LT}$ is high, a larger reduction of the allocation bandwidth may be initiated than in the case of the difference of the estimated SNR to the lower target $SNR_{LT}$ being low. In this way, there is an increased likelihood that the reduced allocation bandwidth BW allows for increasing the SNR of the scheduled UL radio transmission 22 to be above the lower target $SNR_{LT}$, or at least as close as possible to the lower target $SNR_{LT}$.

If the check of block 317 indicates that the UE 10 does not operate at the maximum transmit power $P_{CMAX}$, the scheduler 150 may proceed to block 319 and increase the transmit power $P_{TX}$, as indicated by branch "N". Increasing the transmit power $P_{TX}$ may involve triggering a positive TPC command to the UE 10, e.g., like described above for the DCI 205, 213. By increasing the transmit power $P_{TX}$, the SNR may be improved towards the lower target $SNR_{LT}$.

In addition to increasing the transmit power $P_{TX}$, the scheduler 150 may optionally also continue to block 318 and reduce the allocation bandwidth BW.

The processes of blocks 304 to 319, enclosed by a dotted box, may be performed for each UL radio transmission 22 and for each UE 10 which needs to perform an UL radio transmission 22. Accordingly, the processes may be performed with a time granularity which corresponds to the minimum time unit of allocating radio resources for UL radio transmissions, which in the LTE radio technology is one subframe. Further, it is noted that the processes of blocks 304 to 319 could be performed in an iterative manner. That is to say, after having adapted the allocation BW and/or transmit power $P_{TX}$, one or more further iterations of the processes could be performed starting from block 304, in order to further optimize the allocation bandwidth BW and/or transmit power $P_{TX}$.

As can be seen, in the processes of FIG. 3 the adaptation of the allocation bandwidth BW and the transmit power $P_{TX}$ is accomplished in such a way that the reduction of the allocation bandwidth BW is initiated if the estimate of the SNR is below the lower target $SNR_{LT}$. If the estimate of the SNR is below the upper target $SNR_{UT}$ but not yet below the lower target $SNR_{LT}$ the allocation bandwidth BW is maintained (or may even be increased). The reduction of the transmit power $P_{TX}$ is initiated if the estimate of the SNR is above the upper target $SNR_{UT}$. The upper target $SNR_{UT}$ and the lower target $SNR_{LT}$ may be tuned individually in order to achieve a high performance of the UL radio transmissions by utilizing a high bandwidth and to avoid interference due to an excessively high level of the transmit power.

In accordance with the adapted allocation bandwidth determined as a result of the processes of FIG. 3, the scheduler 150 then allocates one or more RBs to the UE 10. The allocation is performed in such a way that the number of allocated RBs does not exceed the determined allocation bandwidth. However, allocating less RBs is possible as well, e.g., if the number of available RBs is not sufficient to reach the full allocation bandwidth.

In order to avoid that the adaptation of the allocation bandwidth BW for values of the estimate of the SNR close to the lower target $SNR_{LT}$ causes a ping-pong effect, a margin at the lower target $SNR_{LT}$ may be defined. The margin may have a size of about 10% of the interval between the lower target $SNR_{LT}$ and the upper target $SNR_{UT}$ and thus, in units of dB, be in a similar range as the minimum step size of adapting the transmit power $P_{TX}$. The margin may be defined to extend from the lower target $SNR_{LT}$ to higher values of the estimate of the SNR. If the estimate of the SNR is within the margin at the lower target $SNR_{LT}$, the allocation bandwidth BW may be maintained, even if it is still below the maximum allocation bandwidth $BW_{max}$.

Further, in order to avoid that the adaptation of the transmit power $P_{TX}$ for values of the estimate of the SNR close to the upper target $SNR_{UT}$ causes a ping-pong effect, a margin at the upper target $SNR_{UT}$ may be defined. The margin may have a size of about 10% of the interval between the lower target $SNR_{LT}$ and the upper target $SNR_{UT}$ and thus, in units of dB, be in a similar range as the minimum step size of adapting the transmit power $P_{TX}$. The margin may be defined to extend from the upper target $SNR_{UT}$ to lower values of the estimate of the SNR. If the estimate of the SNR is within the margin at the upper target $SNR_{UT}$, the transmit power $P_{TX}$ may be maintained, even if it is still below the maximum transmit power $P_{CMAX}$.

The margin at the lower target $SNR_{LT}$ and the margin at the upper target $SNR_{UT}$ may be used in combination. However, it would also be possible to utilize either only the margin at the lower target $SNR_{LT}$ or the margin at the upper target $SNR_{UT}$.

Further, it is noted that in order to avoid a ping-pong effect in the adaptation of the allocation bandwidth BW, also a hysteresis-like behavior could be configured at the lower target $SNR_{LT}$ by causing the adaptation of the allocation BW to depend on whether the estimate of the SNR is found to increase or to decrease. For example, if the estimate of the SNR is found to have increased from below the lower target $SNR_{LT}$ to above the lower target $SNR_{LT}$, the allocation bandwidth BW may be maintained, even if it is still below the maximum allocation bandwidth BW. The hysteresis-like behavior may also be combined with the margin at the lower target $SNR_{LT}$.

Similarly, in order to avoid a ping-pong effect in the adaptation of the allocation bandwidth BW, also a hysteresis-like behavior could be configured at the upper target $SNR_{UT}$ by causing the adaptation of the transmit power $P_{TX}$ to depend on whether the estimate of the SNR is found to increase or to decrease. For example, if the estimate of the SNR is found to have decreased from above the target $SNR_{UT}$ to below the upper target $SNR_{LT}$, the transmit power PTX may be maintained, even if it is still below the maximum transmit power $P_{CMAX}$. The hysteresis-like behavior may also be combined with the margin at the upper target $SNR_{UT}$.

The hysteresis-like behavior at the lower target $SNR_{LT}$ and hysteresis-like behavior at the upper target $SNR_{UT}$ may be used in combination. However, it would also be possible to utilize either only the hysteresis-like behavior at the lower target $SNR_{LT}$ or the hysteresis-like behavior at the upper target $SNR_{UT}$.

The allocation of the RBs may be based on various types of scheduling mechanisms aiming at ensuring fairness among the UEs 10 served by the access node 100. The scheduling mechanism may also support prioritizing certain UEs 10. Further, the allocation of RBs may consider information received from the UE 10, e.g., information from a scheduling request or a buffer status report sent by the UE 10.

The access node 100 may then send a UL grant indicating the allocated radio resources to the UE 10. Further, the access node 100 may control the UE 10 to apply the adapted transmit power by sending a TPC command to the UE 10. The UL grant and the TPC command may be sent in DCI. The power control may be based on a closed loop mechanism or on a combination of a closed loop mechanism and an open loop mechanism. The transmit power may for example be set according to equation (1), in which the parameter $P_O$ may be set depending on the upper target $SNR_{UT}$ and the lower target $SNR_{LT}$.

Figure 4A:
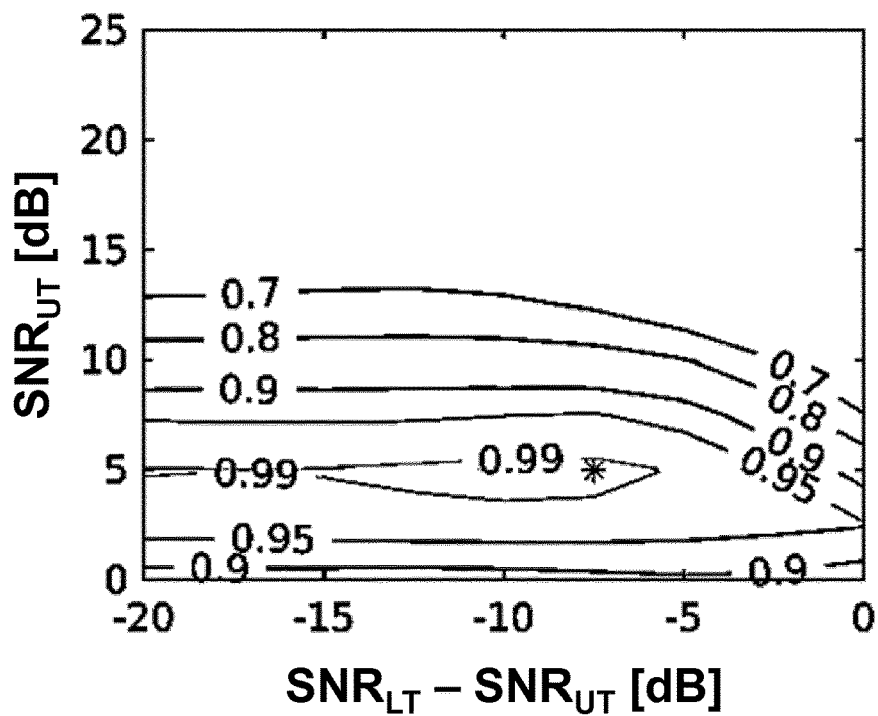
FIGS. 4A and 4B show simulation results for illustrating effects of using an upper and a lower SNR target according to an embodiment of the invention.
Figure 4B:
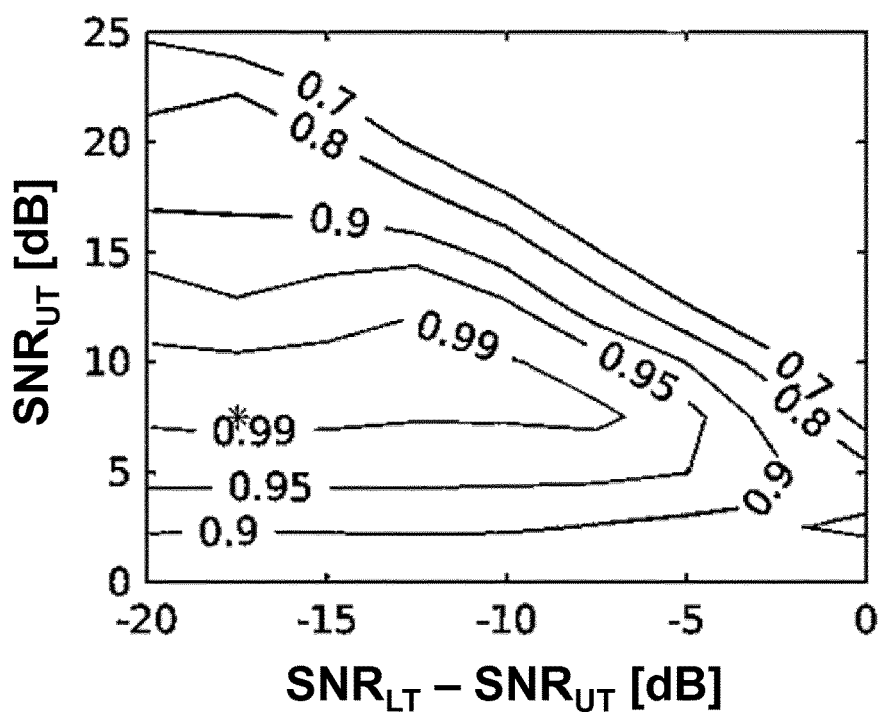

FIGS. 4A and 4B show density plots for illustrating the effect of the upper target $SNR_{UT}$ and lower target $SNR_{LT}$ on performance of the wireless communication system. FIG. 4A shows simulation results obtained for a scenario in which the access node 100 is deployed in an urban microcell environment and has two antenna ports, i.e., uses two antenna elements to receive the UL radio transmissions 22. FIG. 4B shows simulation results obtained for a scenario in which the access node 100 is deployed in an urban microcell environment and has eight antenna ports, i.e., uses eight antenna elements to receive the UL radio transmissions 22.

In the diagrams of FIGS. 4A and 4B, the performance was parametrized in terms of normalized throughput represented by values between 0 and 1, with a maximum performance corresponding to a value of 1. The dependence of the performance on the difference between the lower target $SNR_{LT}$ and the upper target $SNR_{UT}$ and on the value of the upper target $SNR_{UT}$ is shown by contour lines. The optimum setting of the upper target $SNR_{UT}$ and lower target $SNR_{LT}$ is marked by "*". The case of $SNR_{LT}$-$SNR_{UT}$=0 may be seen as being equivalent to using only a single SNR target. As can be seen, in each case using an interval of more than 5 dB between the upper target $SNR_{UT}$ and lower target $SNR_{LT}$ provides significant improvement of performance as compared to using only a single SNR target. In the case of FIG. 4B, an interval of more than 5 dB between the upper target $SNR_{UT}$ and lower target $SNR_{LT}$ of more than 15 dB provides the best performance.

Figure 5:
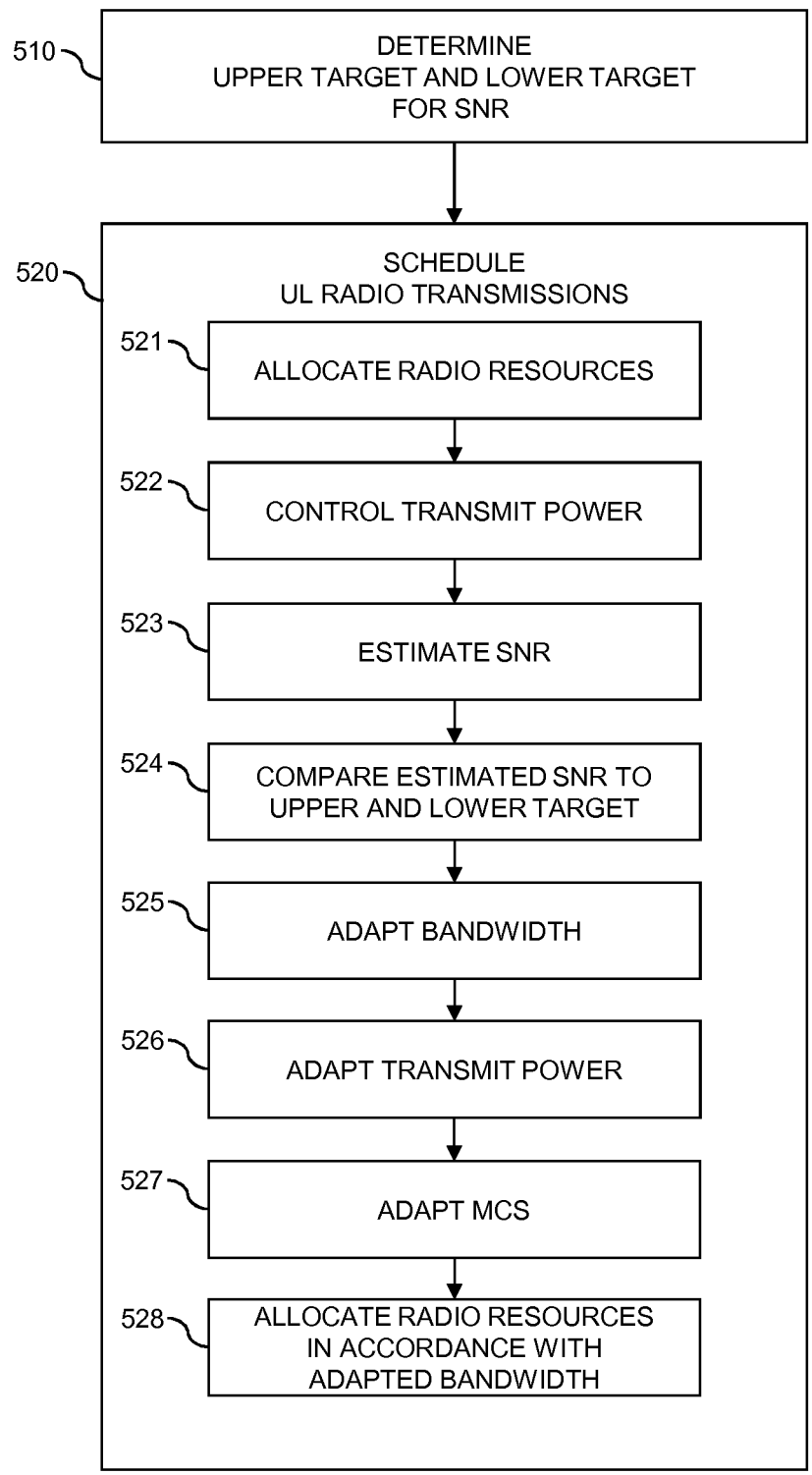
FIG. 5 shows a flowchart for illustrating a method according to an embodiment of the invention.

FIG. 5 shows a flowchart for illustrating a method of controlling radio transmissions, which may be utilized for implementing the illustrated concepts. The method of FIG. 5 may be used for implementing the illustrated concepts in a node of a wireless communication network. Like explained for the access node 100, the node may be an access node which is also responsible for scheduling UL radio transmissions, e.g., like an eNB of the LTE radio technology. However, the method of FIG. 5 could also be implemented by other nodes which are responsible for scheduling UL radio transmissions, e.g., a radio control node which is implemented separately from a base station which receives the UL radio transmissions.

If a processor-based implementation of the node is used, at least some of the steps of the method of FIG. 5 may be performed and/or controlled by one or more processors of the node. Such processor-based implementation of the node may also include a memory storing program code which, when executed by the processor(s), causes the node to perform at least some of the below described method steps. Accordingly, functionalities corresponding to the method steps of FIG. 5 may also be implemented by program code to be stored in a memory of the node.

At step 510, an upper target and a lower target for an SNR of UL radio transmissions from a radio device to the wireless communication network are determined. The radio device may for example be a UE, such as one of the above-mentioned UEs 10. The lower target is at a lower value than the upper target, i.e., the upper target and the lower target are different from each other. The node may accomplish the determination of the upper target and a lower target in an automated manner, e.g., by using information stored in a lookup table. In addition or as an alternative, the determination could also be based on manual inputs.

In some scenarios, the lower target for the SNR may be determined depending on one or more carrier frequencies used for the UL radio transmissions. In addition or as an alternative, the lower target for the SNR may be determined depending on an antenna configuration used for the UL radio transmissions, in particular depending on a number of antenna elements used for receiving the UL radio transmissions. In addition or as an alternative, the lower target for the SNR may be determined depending on a deployment type of the wireless communication network, e.g., depending on ISD, cell size, usage of macro cells, micro cells, or pico cells. It may also be considered whether cells are used to extend coverage of the wireless communication network, by arranging cells with some overlap adjacent to each other, or whether cells are used to enhance capacity, by arranging one cell within the coverage area of another cell. In addition or as an alternative, the lower target for the SNR may be determined depending on a minimum step size of controlling the transmit power of the radio device. For example, the lower target could be determined in relation to the upper target, with the difference between the upper target and the lower target being, in terms of dB, one order of magnitude larger than the minimum step size of controlling the transmit power. The difference between the lower target and the upper target for the SNR may be at least 5 dB.

At step 520, the UL radio transmissions are scheduled. This may be accomplished by a scheduler of the node, such as the above-mentioned scheduler 150. The scheduling may be based on various types of scheduling mechanisms which aim at fair sharing of available radio resources by multiple radio devices. Further, such scheduling mechanism may also allow for prioritization among multiple radio devices.

As further illustrated by blocks 521, 522, 523, 524, 525, 526, 527, and 528, the scheduling of step 520 may include various sub-steps or sub-procedures. The procedures of blocks 523, 524, 525, 526, 527, and 528 are performed for a particular UL radio transmission which is being scheduled.

As illustrated by step 521, the scheduling involves allocating radio resources for the UL radio transmissions. The radio resources may be organized in a time-frequency grid, and the allocation may involve allocating individual resource elements of this grid, or groups of such resource elements, to a particular radio device. For example, the radio resources may be allocated in terms of RBs blocks as defined in the LTE radio technology. The amount of allocated radio resources defines a bandwidth.

As illustrated by step 522, the scheduling also involves controlling a transmit power of the UL radio transmissions. The control of the transmit power may be based on a closed loop control mechanism, which involves sending TPC commands to the radio device. Further, also an open loop control mechanism may be used within the radio device.

At step 523, an estimate of the SNR of the UL radio transmission being scheduled is determined depending on a bandwidth of radio resources to be allocated for the UL radio transmission and depending on a current value of the transmit power. Here, it is to be noted that at this stage the radio resources do not need to be allocated yet. Rather, a bandwidth corresponding to the amount of radio resources to be allocated is used for determining the estimate. Like explained for the above-mentioned allocation bandwidth, the bandwidth may then be used during the actual allocation procedure to define an upper limit of the amount of the allocated radio resources.

The current value of the transmit power may be estimated based on a reported received signal strength of a DL radio transmission from the wireless communication network to the radio device, such as a received signal strength of the above-mentioned DL reference signal 201, 209 or a received signal strength of the above-mentioned DL data transmission 202, 210, as for example indicated in the above-mentioned measurement report 207 or 215. As an alternative or in addition, the current value of the transmit power may be estimated based on a measured signal strength of an UL radio transmission from the radio device to the wireless communication network, such as the above-mentioned UL reference signal 203, 211, the above-mentioned UL radio transmission conveying one or more of the UL data 206, measurement report 207, or power headroom report 208, or the above-mentioned UL radio transmission conveying one or more of the UL data 214, measurement report 215, or power headroom report 216. Further, the estimation of the current value of the transmit power may also be based on a maximum transmit power of the radio device, a power headroom report received from the radio device, and/or one or TPC commands sent to the radio device.

At step 524, the estimate of the SNR is compared to at least one of the lower target and to the upper target. In this way, it can be determined whether the estimate of the SNR is below the lower target, in an interval between the lower target and the upper target, or above the upper target.

At step 525, the bandwidth is adapted depending on a result of the comparison. The adaptation may involve reducing the bandwidth, increasing the bandwidth, or maintaining the bandwidth.

Further, also the transmit power may be adapted depending a result of on the comparison, as indicated by step 526.

In response to the estimate of the SNR being below the lower target, the adaptation may involve reducing the bandwidth, e.g., as explained in connection with block 318 of FIG. 3.

In some scenarios, the adaptation of the bandwidth may involve increasing the bandwidth in response to the estimate of the SNR being above the lower target, e.g., as explained in connection with block 312 of FIG. 3.

In some scenarios, the node may determine whether the radio device operates at a maximum transmit power, e.g., as explained in connection with block 309 or 317 of FIG. 3. The determination whether the radio device operates at a maximum transmit power may be based on at least one of a power headroom report received from the radio device and power control commands sent to the radio device, such as the above-mentioned TCP commands included in the DCI 205 or 213 or the above-mentioned power headroom reports 208, 216.

On the basis of the determination whether the radio device operates at the maximum transmit power, the adaptation of the bandwidth may involve reducing the bandwidth in response to the estimate of the SNR being below the lower target and determining that the radio device operates at the maximum transmit power, e.g., as explained in connection with blocks 317 and 318 of FIG. 3.

On the basis of the determination whether the radio device operates at the maximum transmit power, the adaptation of the transmit power may involve, in response to the estimate of the SNR being below the lower target and determining that the radio device operates below the maximum transmit power, controlling the radio device to increase the transmit power, e.g., as explained in connection with blocks 309 and 313 of FIG. 3.

On the basis of the determination whether the radio device operates at the maximum transmit power, the adaptation of the transmit power may also involve, in response to the estimate of the SNR being below the upper target and determining that the radio device operates below the maximum transmit power, controlling the radio device to increase the transmit power, e.g., as explained in connection with blocks 317 and 319 of FIG. 3.

In some scenarios, the adaptation of the bandwidth and the transmit power may involve maintaining the bandwidth and the current value of the transmit power in response to the estimate of the SNR being between the lower target and the upper target, e.g., as explained in connection with blocks 307, 308, and 311 of FIG. 3.

In some scenarios, the adaptation of the transmit power may also involve reducing the transmit power in response to the estimate of the SNR being above the upper target, e.g., as explained in connection with block 314 of FIG. 3.

As illustrated by step 527, the scheduling may also involve adapting an MCS for the UL radio transmission depending on the estimate of the SNR. As explained in connection with blocks 308, 309, 310, 312 of FIG. 3 the bandwidth may be maintained or even increased when the estimate of the SNR is in the interval between the lower target and the upper target. In this case, selecting a more robust MCS may be used to compensate the reduction of the SNR as compared to the upper target.

At step 528 radio resources are allocated for the UL radio transmission. The allocation is accomplished in accordance with the bandwidth as adapted at step 570. If the bandwidth was reduced at step 570, the radio resources for the UL radio transmission are allocated in accordance with the reduced bandwidth. If the bandwidth was increased at step 570, the radio resources for the UL radio transmission are allocated in accordance with the increased bandwidth. If the bandwidth was maintained at step 570, the radio resources for the UL radio transmission are allocated in accordance with the maintained bandwidth. The allocation may be accomplished in such a manner that the bandwidth of the actually allocated radio resources does not exceed the adapted bandwidth of step 570.

Figure 6:
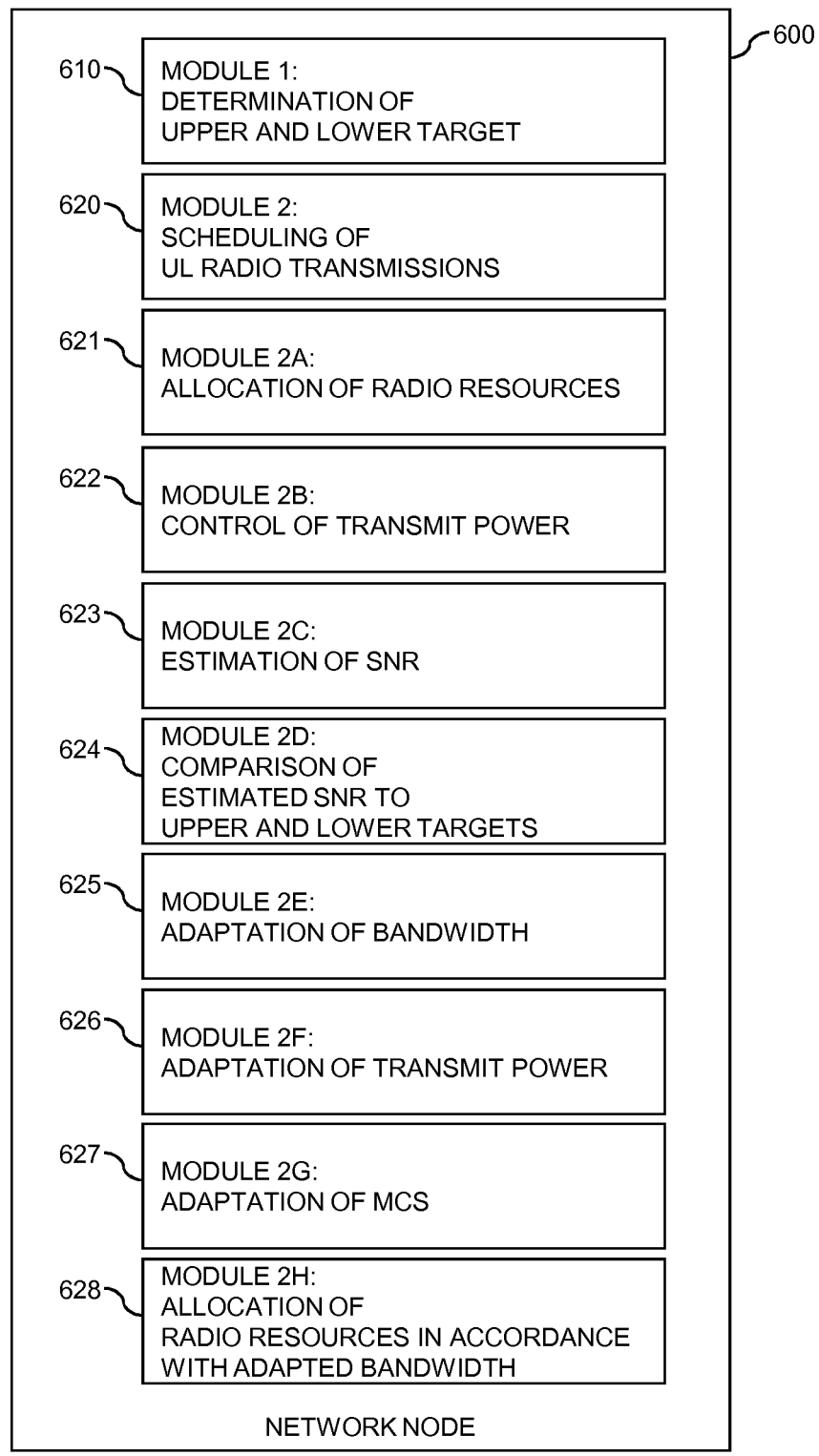
FIG. 6 shows a block diagram for illustrating functionalities of a network node according to an embodiment of the invention.

FIG. 6 shows a block diagram for illustrating functionalities of a network node 600 which operates according to the method of FIG. 5. The network node 600 may for example correspond to the above-mentioned access node 100. As illustrated, the network node 600 may be provided with a module 610 configured to determine an upper target and a lower target of an SNR of UL radio transmissions, such as explained in connection with step 510. Further, the network node 600 may be provided with a module 620 configured to schedule the UL radio transmissions, such as explained in connection with step 520. Further, the network node 600 may be provided with a module 621 configured to allocate radio resources for the UL radio transmissions, such as explained in connection with step 521. Further, the network node 600 may be provided with a module 622 configured to control a transmission power of the UL radio transmissions, such as explained in connection with step 522. Further, the network node 600 may be provided with a module 623 configured to determine an estimate of an SNR of the UL radio transmissions, such as explained in connection with step 523. Further, the network node 600 may be provided with a module 624 configured to compare the estimate of the SNR to the upper target and/or lower target, such as explained in connection with step 524. Further, the network node 600 may be provided with a module 625 configured to adapt the bandwidth depending on the comparison, such as explained in connection with step 525. Further, the network node 600 may be provided with a module 626 configured to adapt the transmit power depending on the comparison, such as explained in connection with step 526. Further, the network node 600 may be provided with a module 627 configured to adapt an MCS of the UL radio transmission depending on the estimate of the SNR, such as explained in connection with step 527. Further, the network node 600 may be provided with a module 628 configured to allocate radio resources for the UL radio transmission in accordance with the adapted bandwidth, such as explained in connection with step 528.

It is noted that the network node 600 may include further modules for implementing other functionalities, such as known functionalities of an eNB or similar access node of a wireless communication network. Further, it is noted that the modules of the network node 600 do not necessarily represent a hardware structure of the network node 600, but may also correspond to functional elements, e.g., implemented by hardware, software, or a combination thereof.

Figure 7:
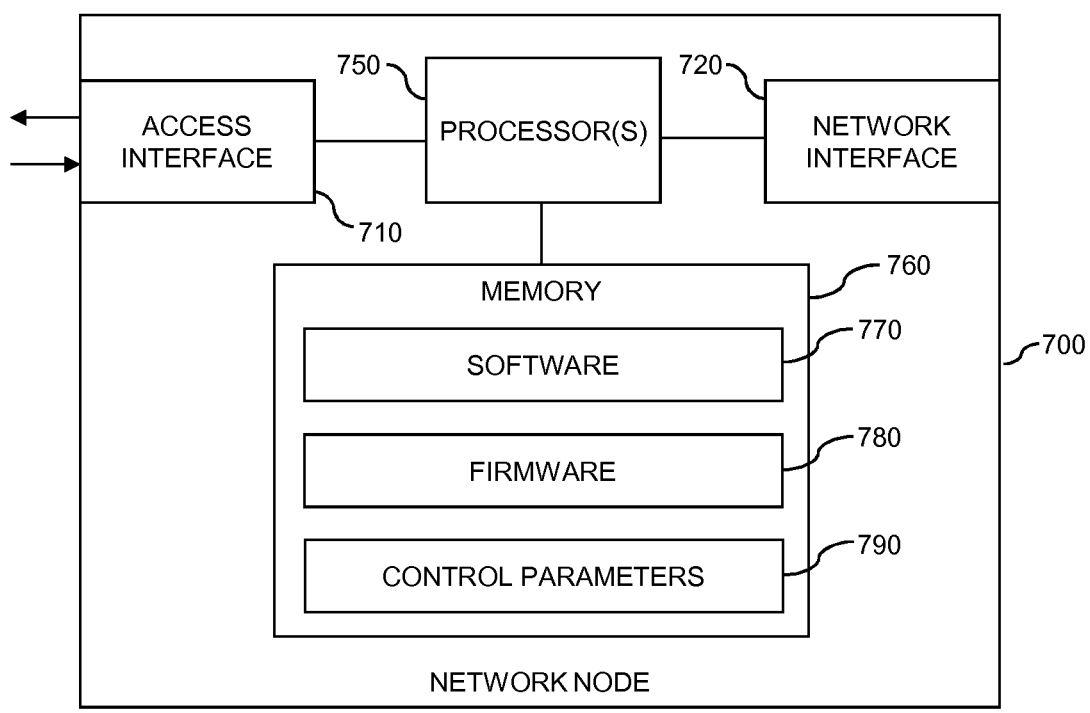
FIG. 7 schematically illustrates structures of a network node according to an embodiment of the invention.

FIG. 7 illustrates a processor-based implementation of a network node 700 which may be used for implementing the above described concepts. For example, the structures as illustrated in FIG. 7 may be used for implementing the concepts in the above-mentioned access node 100.

As illustrated, the network node 700 may include an access interface 710. The access interface 710 may be used for communication with one or more radio devices, such as the above-mentioned UEs 10. In some scenarios, the access interface 710 may be a radio interface for receiving the above-mentioned UL radio transmissions 22 from the radio device(s). In this case, the radio interface could also be used for sending the above-mentioned DL radio transmissions 21 to the radio device(s). The radio interface could for example be based on the above-mentioned LTE radio technology or 5G radio technology. In some implementations, the access interface 710 could also connect the node to a further node which provides the radio interface to the radio device(s), e.g., to a remote radio head. As further illustrated, the network node 700 may include a network interface 720. The network interface 720 may be used for communication with one or more other nodes of the wireless communication network.

Further, the network node 700 may include one or more processors 750 coupled to the interface(s) 710, 720 and a memory 760 coupled to the processor(s) 750. By way of example, the interface(s) 710, the processor(s) 750, and the memory 760 could be coupled by one or more internal bus systems of the network node 700. The memory 760 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 760 may include software 770, firmware 780, and/or control parameters 790. The memory 760 may include suitably configured program code to be executed by the processor(s) 750 so as to implement the above-described functionalities, such as explained in connection with FIG. 5.

It is to be understood that the structures as illustrated in FIG. 7 are merely schematic and that the network node 700 may actually include further components which, for the sake of clarity, have not been illustrated, e.g., further interfaces or processors. Also, it is to be understood that the memory 760 may include further program code for implementing known functionalities of an eNB or similar access node. According to some embodiments, also a computer program may be provided for implementing functionalities of the network node 700, e.g., in the form of a physical medium storing the program code and/or other data to be stored in the memory 760 or by making the program code available for download or by streaming.

As can be seen, the concepts as described above may be used for efficiently controlling UL radio transmissions with respect to utilized bandwidth and transmit power. In particular, by using the upper and lower targets for the SNR, the a high bandwidth allocation can be maintained for UL radio transmissions also under conditions of lowering SNR.

It is to be understood that the examples and embodiments as explained above are merely illustrative and susceptible to various modifications. For example, the illustrated concepts may be applied in connection with various kinds of radio technologies, without limitation to the above-mentioned examples of the LTE or 5G radio technology. Further, it is noted that the SNR as considered in the illustrated concepts may be based on various types of noise, including interference. Accordingly, in some implementations the SNR may also be an SINR. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling radio transmissions in a wireless communication network, the method comprising:
   determining a lower target and an upper target for a signal to noise ratio of uplink radio transmissions from a radio device to the wireless communication network; and
   scheduling the uplink radio transmissions by allocating radio resources for the uplink radio transmissions and by controlling a transmit power of the uplink radio transmissions, wherein said scheduling further comprises:
      determining an estimate of the signal-to-noise ratio of the uplink radio transmission based on a bandwidth of radio resources to be allocated for the uplink radio transmission and a current value of the transmit power;
      comparing the estimate of the signal-to-noise ratio to at least one of the lower target and the upper target;
      determining whether the radio device operates at a maximum transmit power;
      in response to the estimate of the signal-to-noise ratio being below the lower target and determining that the radio device operates below the maximum transmit power, controlling the radio device to increase the transmit power, and
      in response to the estimate of the signal-to-noise ratio being between the lower target and the upper target, maintaining the bandwidth and the current value of the transmit power and allocating radio resources for the uplink radio transmission in accordance with the maintained bandwidth.

2. The method according to claim 1, wherein said scheduling further comprises, in response to the estimate of the signal-to-noise ratio being below the lower target, reducing the bandwidth and allocating radio resources for the uplink radio transmission in accordance with the reduced bandwidth.

3. The method according to claim 2, wherein reducing the bandwidth and allocating radio resources for the uplink radio transmission in accordance with the reduced bandwidth is further in response to determining that the radio device operates at the maximum transmit power.

4. The method according to claim 3, wherein determining whether the radio device operates at the maximum transmit power is based on at least one of a power headroom report received from the radio device and power control commands sent to the radio device.

5. The method according to claim 1, wherein said scheduling further comprises, in response to the estimate of the signal-to-noise ratio being below the upper target and determining that the radio device operates below the maximum transmit power, controlling the radio device to increase the transmit power.

6. The method according to claim 1, wherein said scheduling further comprises, in response to the estimate of the signal-to-noise ratio being above the lower target, increasing the bandwidth and allocating radio resources for the uplink radio transmission in accordance with the increased bandwidth.

7. The method according to claim 1, further comprising estimating a current value of the transmit power based on one of the following:
   a reported received signal strength of a downlink radio transmission from the wireless communication network to the radio device; or
   a measured signal strength of an uplink radio transmission from the radio device to the wireless communication network.

8. The method according to claim 1, further comprising at least one of the following operations:
   adapting a modulation and coding scheme for the uplink radio transmission based on the estimate of the signal-to-noise ratio; and
   determining the lower target for the signal-to-noise ratio based on one of the following:
      one or more carrier frequencies used for the uplink radio transmissions,
      an antenna configuration used for the uplink radio transmissions,
      a deployment type of the wireless communication network, and
      a minimum step size of controlling the transmit power of the radio device.

9. The method according to claim 1, wherein the difference between the lower target and the upper target for the signal-to-noise ratio is at least 5 dB.

10. A node for a wireless communication network, the node comprising:
- an access interface configured to communicate with one or more radio devices; and
- one or more processors operably coupled to the access interface, whereby the processors are configured to execute program code that causes the node to:
- determine a lower target and an upper target for a signal to noise ratio of uplink radio transmissions from a radio device to the wireless communication network; and
- schedule the uplink radio transmissions by allocating radio resources for the uplink radio transmissions and by controlling a transmit power of the uplink radio transmissions, wherein execution of the program code causes the node to schedule the uplink transmissions further by:
  - determining an estimate of the signal-to-noise ratio of the uplink radio transmission based on a bandwidth of radio resources to be allocated for the uplink radio transmission and a current value of the transmit power;
  - comparing the estimate of the signal-to-noise ratio to at least one of the lower target and the upper target;
  - determining whether the radio device operates at a maximum transmit power;
  - in response to the estimate of the signal-to-noise ratio being below the lower target and determining that the radio device operates below the maximum transmit power, controlling the radio device to increase the transmit power; and
  - in response to the estimate of the signal-to-noise ratio being between the lower target and the upper target, maintaining the bandwidth and the current value of the transmit power and allocating radio resources for the uplink radio transmission in accordance with the maintained bandwidth.

11. The node according to claim 10, wherein execution of the program code causes the node to schedule the uplink transmissions further by, in response to the estimate of the signal-to-noise ratio being below the lower target, reducing the bandwidth and allocating radio resources for the uplink radio transmission in accordance with the reduced bandwidth.

12. The node according to claim 11, wherein reducing the bandwidth and allocating radio resources for the uplink radio transmission in accordance with the reduced bandwidth is further in response to determining that the radio device operates at the maximum transmit power.

13. The node according to claim 12, wherein execution of the program code causes the node to determine whether the radio device operates at the maximum transmit power based on at least one of a power headroom report received from the radio device and power control commands sent to the radio device.

14. The node according to claim 10, wherein execution of the program code causes the node to schedule the uplink transmissions further by, in response to the estimate of the signal-to-noise ratio being below the upper target and determining that the radio device operates below the maximum transmit power, controlling the radio device to increase the transmit power.

15. The node according to claim 10, wherein execution of the program code causes the node to schedule the uplink transmissions further by, in response to the estimate of the signal-to-noise ratio being above the lower target, increasing the bandwidth and allocating radio resources for the uplink radio transmission in accordance with the increased bandwidth.

16. The node according to claim 10, wherein execution of the program code causes the node to estimate a current value of the transmit power based on one of the following:
- a reported received signal strength of a downlink radio transmission from the wireless communication network to the radio device; or
- a measured signal strength of an uplink radio transmission from the radio device to the wireless communication network.

17. The node according to claim 10, wherein execution of the program code causes the node to perform at least one of the following operations:
- adapt a modulation and coding scheme for the uplink radio transmission based on the estimate of the signal-to-noise ratio; and
- determine the lower target for the signal-to-noise ratio based on one of the following:
  - one or more carrier frequencies used for the uplink radio transmissions,
  - an antenna configuration used for the uplink radio transmissions,
  - a deployment type of the wireless communication network, and
  - a minimum step size of controlling the transmit power of the radio device.

18. The node according to claim 10, wherein the difference between the lower target and the upper target for the signal-to-noise ratio is at least 5 dB.

* * * * *